UNITED STATES PATENT OFFICE.

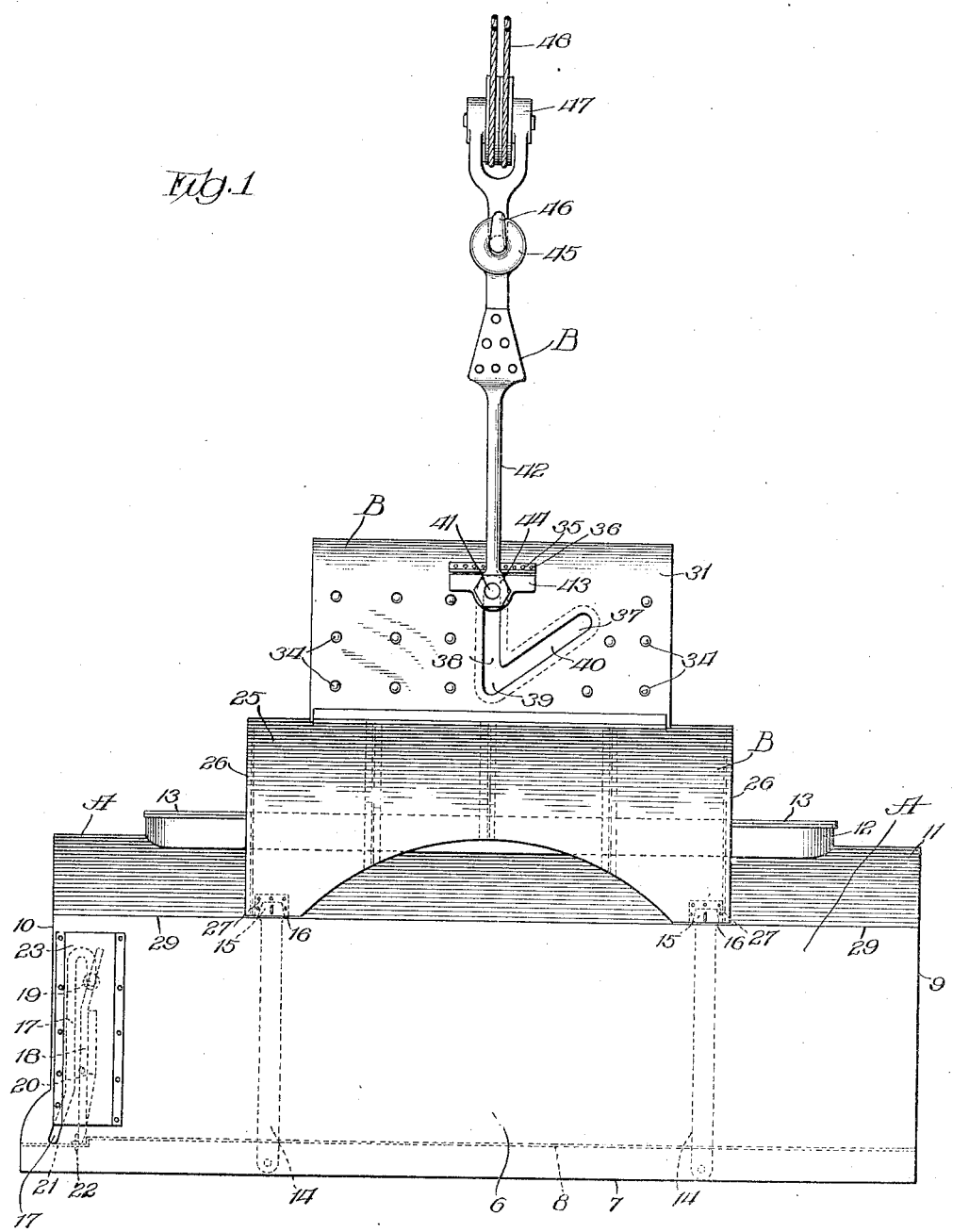

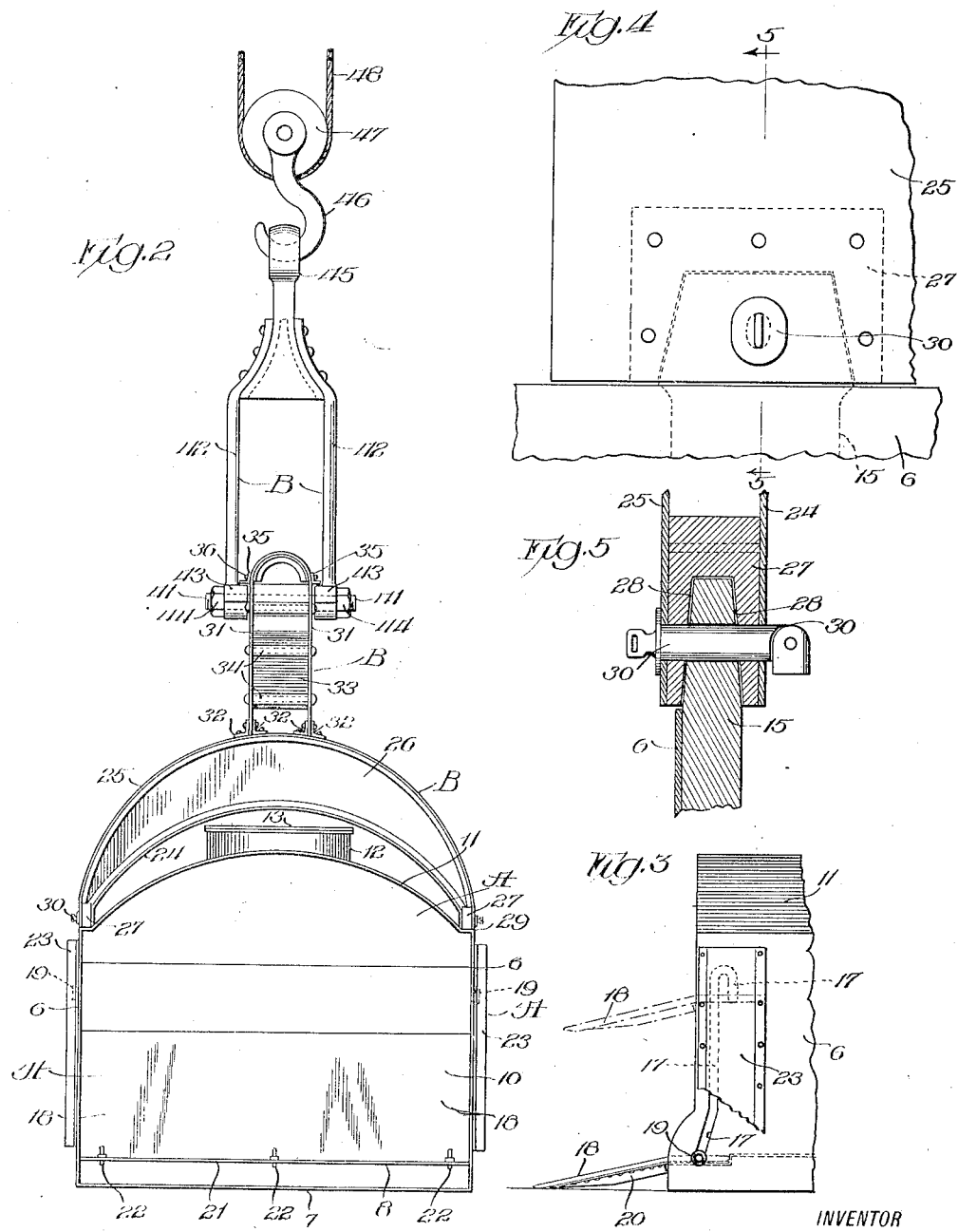

JAMES G. GUNN, OF CHEROKEE, IOWA.

CARGO-HANDLING APPARATUS.

1,351,167. Specification of Letters Patent. Patented Aug. 31, 1920.

Application filed January 2, 1920. Serial No. 348,827.

*To all whom it may concern:*

Be it known that I, JAMES G. GUNN, a citizen of the United States, and a resident of Cherokee, in the county of Cherokee and State of Iowa, have invented a new and useful Improvement in Cargo-Handling Apparatus, of which the following is a full, clear, and exact description.

My invention relates to improvements in cargo handling devices, and it consists in the combinations, constructions, and arrangements herein described and claimed.

An object of my invention is to provide a cargo handling device by means of which cargoes may be quickly and easily transferred from place to place and the cargo dumped or unloaded expeditiously in any place and manner desired.

A further object of my invention is to devise a cargo handling device of the type described, which may be readily dumped by the mere operation of a crane or other lifting device employed.

Other objects and advantages will appear in the following specification, and the novel features of the invention will be particularly pointed out in the appended claims.

My invention is illustrated in the accompanying drawings, forming part of this application, in which—

Figure 1 is a side elevation of the cargo handling device,

Fig. 2 is an end view of the device,

Fig. 3 is a side view of a portion of my device,

Fig. 4 is a detail front view of a portion of my device showing the arrangement for fastening the lifter to the receptacle, Fig. 5 is a sectional view along the line 5—5 of Fig. 4.

Referring to Fig. 1, it will be noted that I provide a receptacle indicated in general at A, and a lifter indicated in general at B, both substantially as shown. The receptacle A consists of similar side portions 6, a bottom portion 7, a second bottom plate 8 spaced above the bottom portion 7, end portions 9 and 10, and a semi-cylindrical top portion 11. The top portion 11 has a central extension 12 through which goods may be loaded into the receptacle A. The extension 12 is open at its top and is provided with a removable cover portion 13.

Each side portion 6 has two stanchions 14 fixedly fastened to the inner side at spaced equal distances from the ends thereof. The top portions 15 of the stanchions 14 project through suitable openings 16 at the junction of the side plates 6 and the top plates 11 and form the male members in the arrangement by means of which the lifter B is detachably fastened at will to the receptacle A.

Slots 17 are provided in the side portions and are positioned as shown by the dotted lines in Fig. 3, the slots in the two side portions 7 being arranged to register. A dump door 18 is provided with pivot pins 19, which are slidably disposed in the slots 17. 20 is a reinforcing plate rigidly fastened to the door 18. It will be noted by reference to Fig. 3 that the door may be swung upwardly when the pins 19 are bearing against the end of the shorter portion of the U-shaped end of the slot 17. The door 18, when opened upwardly, can be maintained in that position by hooks and eyes or by any other suitable means, not shown. The pins 19 may also be moved along the slots 17 until they bear upon the bottom end of the slots 17 and the door 18 opened downwardly to form a run-way over which goods may be transported into or out of the receptacle A. The door 18, when closed, swings downwardly against an offset portion 21 of the second bottom plate 8 and may be kept in that position by any suitable means, as by the stop 22. The door 18 may be opened by means of hand wheels or any other approved means, not shown. Cover plates 23 are riveted to the side portions 6 to cover the slots 17.

The lifter B consists of two arcuate plates 24 and 25 connected by a plurality of transverse plates 26, four being shown in the accompanying drawings. Castings 27 are rigidly fastened between the plates 24 and 25 and have tapered recesses 28. The castings 27 are located near the corners and are positioned to form the female members adapted to the male members 15 of the receptacle A. The top portion 11 has offsets 29 extending the entire length thereof on either side. The female members 27 engage the male members 15 and are detachably fastened thereto by drop end pins 30 of an ordinary type through registering openings provided through the female members 27 and the male members 15. The drop-end pins 30 may be secured to the female members 27 in any ordinary manner as by a chain, to prevent the same being lost.

An inverted U-shaped plate 31 is fixedly fastened to the plate 25 in the position and in the manner indicated in the accompanying drawings, angle bars 32 being used to effect the connection. A solid casting 33 is within the space inclosed by the inverted U-shaped plate 31. The latter is securely fastened thereto by rivets 34 through both sides of the U-shaped plates 31 and the inclosed casting 33. Longitudinally extending lugs 35 are disposed upon the U-shaped plate 31, being placed in a corresponding position on each side. The lugs 35 are fixedly fastened to the U-shaped plates 31 by countersunk rivets 36 driven flush with the surface of the lugs so as not to interfere with operation of an engaging member.

An angular slot designated in general at 37 extends through both sides of the inverted U-shaped plate 31 and the inclosed casting 33. One side 38 of this angular slot 37 extends perpendicularly from immediately underneath the center of the lug 35 to the apex 39, the other side 40 extending at an angle of approximately 45 degrees. A pin 41 adapted to the slot 37 connects two similar arms 42. The arms 42 have integral right angularly disposed flattened portions 43 which are arranged to press against the lugs 35 to normally prevent the tilting of the receptacle A. The flattened portions 43 are held in position by nuts 44 on either end of the pin 41. The other ends of the arms 42 are flattened also and are riveted together and to the shank of a ring 45 as indicated in Fig. 2. The ring 45 is adapted to engage the hook 46 of a pulley block 47. The latter is connected by cables 48 to a crane or any other suitable lifting means.

From the foregoing description of the various parts of the device, the operation thereof may be readily understood. It is to be understood that while my device was designed primarily for use with a crane of the mono rail type, it is suitable for use with any type of crane and in fact, may be used with any overhead lifting mechanism of an ordinary type.

In operation, the lifter B is lowered into engagement with the receptacle A. The connections are made by inserting the drop end pins 30 through the registering openings in the female members 27 of the lifter B and the male members 15 of the receptacle A. The receptacle A containing the cargo is lifted by the crane and is transported to the place desired. The pin 41 is now bearing against the upper part of the perpendicular side 38 of the angular slot 37. The flattened portions 43 of the arms 42 are pressing against the lugs 35 and the lifter B with the lifted receptacle A are held in upright position. In case it is desired to dump the goods carried, the receptacle A is lowered to the desired position. A further lowering by the crane of the arms 42 will move the same with their flattened ends 43 and the connecting pin 41 along the perpendicular angular side 38 of the slot 37 through the apex 39, the crane is moved slightly toward the right in Fig. 1, and a lifting of the crane then guides the pin 41 and the connected arms 42 up the side 40 of the slot 37. A further lifting force exerted by the crane will partially up-end the receptacle A and will cause the contents thereof to be dumped through the door-way in the end 10 of the receptacle A when the door 18 has been opened. Or if it is desired to unload, the contents of the receptacle A by other means, the receptacle A is placed in upright position in the manner described. The door 18 is opened downwardly to form a run-way. The receptacle A may then be entered and the contents removed upon trucks or in any other ordinary manner.

When the receptacle A is unloaded, it is placed as desired. The pins 30 are pulled out, thus disconnecting the lifter B from the receptacle A. The operation may be then repeated until any number of loaded receptacles A have been properly placed and unloaded.

My device is constructed as described along lines that will allow the handling of ten tons or more at each operation. My device provides a means when used in conjunction with a crane or other lifting device of expeditiously transferring cargo from barges to dock or vice versa, or in fact for handling cargo in any terminal where a lifting device is at hand. Its adoption would permit the construction of barges to be simplified in that cargo could be carried upon the decks of the same and the loading into holds from which the cargo can be unloaded only with difficulty could be discontinued. A further advantage would be secured in that the cargo receptacles may be transported to a warehouse at any level which would permit the construction of warehouses along rivers and lakes above the high water line.

I claim:

1. A cargo handling device comprising a receptacle, a lifting device detachably secured to said receptacle and being provided with a V-shaped slot, means disposed in said slot and adapted to be attached to a crane or similar power device for raising and lowering the receptacle and its attached lifting device when the said means is in one arm of the V-shaped slot, and for dumping the receptacle when it is in the other arm of the slot.

2. The combination of a receptacle, a lifting device detachably connected with said receptacle, said lifting device having a V-shaped slot, one arm of the slot extending vertically and the other arm being angularly disposed with respect to the first arm, means disposed in said slot and adapted to be attached to a crane or similar power device for raising and lowering the receptacle when the said means is in the vertically extending arm of the V-shaped slot, and for dumping the receptacle when it is in the angularly disposed arm of the slot.

3. The combination of a receptacle, a lifting device detachably connected with said receptacle, said lifting device having a V-shaped slot, one arm of the slot extending vertically and the other arm being angularly disposed with respect to the first arm, means disposed in said slot and adapted to be attached to a crane or similar power device for raising and lowering the receptacle when the said means is in the vertically extending arm of the V-shaped slot, and for dumping the receptacle when it is in the angularly disposed arm of the slot, and means carried by the lifting device and coöperating with the means in the slot for maintaining the lifting device and the receptacle in a horizontal position while the first-named means is in the vertical arm of the slot.

4. The combination of a receptacle, a lifting device disposed normally above the receptacle, means for detachably securing the lifting device to the receptacle, said lifting device comprising a casing having opposed walls and having registering V-shaped slots, said slots having a vertically extending arm, an arm extending angularly with respect to the vertically extending arm, means extending through said registering slots and adapted to be connected to a crane for lifting the receptacle and its attached lifting device, laterally extending lugs carried by the lifting device, and laterally extending members carried by said means and arranged to engage said lugs for preventing the tilting of the lifting device and the receptacle when they are raised from the ground.

5. The combination of a receptacle, a lifting device disposed normally above the receptacle, means for detachably securing the lifting device to the receptacle, said lifting device comprising a casing having opposed walls and having registering V-shaped slots, said slots having a vertically extending arm, an arm extending angularly with respect to the vertically extending arm, means extending through said registering slots and adapted to be connected to a crane for lifting the receptacle and its attached lifting device, laterally extending lugs carried by the lifting device, and laterally extending members carried by said means and arranged to engage said lugs for preventing the tilting of the lifting device and the receptacle when they are raised from the ground, the movement of said means into the angularly disposed arms of the slots serving to dump the receptacle when the lifting force is again applied.

6. The combination of a receptacle, a lifting device therefor comprising a casing having opposed walls provided with registering V-shaped slots, a casting disposed between the walls and being provided with a V-shaped slot arranged to register with the first named slots, means for detachably connecting the casing to the receptacle, a pin disposed in said registering slots, lugs carried by the lifting device, means carried by the pins for engaging the lugs to prevent the tilting of the lifting device and the receptacle, and attachments to said pins for connecting the latter to a crane.

7. The combination of a receptacle, a lifting device having attaching means for securing it to the receptacle, said lifting device being provided with a V-shaped slot, a pin extending through said V-shaped slot, attachments for connecting the pin with a crane, said pin being arranged to enter either arm of said V-shaped slot, the receptacle and the lifting device being overbalanced by the lifting force when the pin is in one of said slots, whereby the receptacle is tilted, and a door carried by the receptacle and arranged to swing downwardly to form an inclined runway.

8. The combination of a receptacle, a lifting device therefor having a V-shaped slot, one arm of said V-shaped slot extending vertically, a pin disposed in the slot, attachments for connecting the pin to a crane, means for normally preventing the tilting of the lifting device and the receptacle when the lifting power is applied, said receptacle having registering slots, a door having pins journaled in said slots and adapted to slide therein, said door being arranged to close when the pins are at one end of the slot and to form a runway when they are at the other end.

JAMES G. GUNN.